United States Patent [19]
Ugolick et al.

[11] Patent Number: 5,993,961
[45] Date of Patent: Nov. 30, 1999

[54] USE OF PRESSURE-SENSITIVE ADHESIVE AS A BARRIER COATING

[75] Inventors: Ronald Ugolick, San Dimas; T. Liem Ang, South Pasadena; Luigi Sartor, Pasadena, all of Calif.

[73] Assignee: Avery Dennison Corporation, Pasadena, Calif.

[21] Appl. No.: 08/481,123

[22] Filed: Jun. 7, 1995

[51] Int. Cl.⁶ ....................................... B32B 7/12
[52] U.S. Cl. ................. 428/354; 428/356; 428/355 AC; 427/208.8; 427/208.4
[58] Field of Search ................... 428/354, 353, 428/36, 355 BL, 355 AC; 427/208, 208.4, 207.1

[56] References Cited

U.S. PATENT DOCUMENTS

| | | |
|---|---|---|
| 3,464,842 | 9/1969 | Jackstadt . |
| 3,547,852 | 12/1970 | Burke, Jr. . |
| 4,045,600 | 8/1977 | Williams . |
| 4,086,388 | 4/1978 | Brown . |
| 4,112,177 | 9/1978 | Salditt et al. . |
| 4,175,156 | 11/1979 | Ikins ................................. 428/354 X |
| 4,260,659 | 4/1981 | Gobran . |
| 4,284,681 | 8/1981 | Tidmarsh et al. . |
| 4,335,171 | 6/1982 | Zenk . |
| 4,374,883 | 2/1983 | Winslow . |
| 4,543,139 | 9/1985 | Freedman et al. . |
| 4,577,204 | 3/1986 | Shibata et al. . |
| 4,581,281 | 4/1986 | Gerace . |
| 4,605,592 | 8/1986 | Paquette et al. ............. 428/355 AC X |
| 4,822,676 | 4/1989 | Mudge . |
| 4,892,917 | 1/1990 | Mudge . |
| 4,894,259 | 1/1990 | Kuller . |
| 4,908,268 | 3/1990 | Mudge . |
| 4,939,220 | 7/1990 | Mudge . |
| 4,943,461 | 7/1990 | Karin ........................... 428/355 AC X |
| 4,968,558 | 11/1990 | Briddell et al. . |
| 4,968,559 | 11/1990 | Hideo et al. . |
| 5,000,810 | 3/1991 | Silverstein . |
| 5,089,320 | 2/1992 | Straus et al. . |
| 5,189,126 | 2/1993 | Bernard . |
| 5,229,207 | 7/1993 | Paquette et al. .................... 428/354 X |
| 5,232,958 | 8/1993 | Mallya et al. . |

(List continued on next page.)

FOREIGN PATENT DOCUMENTS

| | | |
|---|---|---|
| 0103407 | 8/1986 | European Pat. Off. . |
| 2 206916 | 10/1972 | Germany . |
| 5-046091 | 2/1993 | Japan . |
| 9322391 | 11/1993 | WIPO . |

OTHER PUBLICATIONS

Chemical Abstracts, vol. 104, No. 14, p. 61, Apr. 7, 1986, Columbus, Ohio, abstract No. 111067, "Pressure Sensitive Adhesive tapes and Films".
Technical Data Sheet from Schenectady International for Acrylic Polymer HRJ–4527.
Technical Data Sheet from Schenectady International for Acrylic Polymer HRJ–10753.
Technical Data Sheet from Schenectady International for Acrylic Polymer HRJ–12531.

*Primary Examiner*—Daniel Zirker
*Attorney, Agent, or Firm*—Knobbe, Martens, Olson & Bear, LLP

[57] ABSTRACT

A multilayer adhesive construction and method for production of said construction are provided. The construction comprises a facestock, a barrier layer on the facestock, and an adhesive layer on the barrier layer. The barrier layer comprises a pressure-sensitive adhesive which inhibits the migration of mobile species such as oils, resins, tackifiers, or plasticizers from the adhesive layer into the facestock or from the facestock into the adhesive layer. This migration of mobile ingredients often manifests itself as swelling or hardening of the facestock which, in turn, leads to wrinkling of the adhesive construction and general loss of adhesion. The multilayer adhesive construction of the invention thus improves adhesion and the appearance of the label by inhibiting wrinkling and/or staining.

38 Claims, 3 Drawing Sheets

U.S. PATENT DOCUMENTS

| | | |
|---|---|---|
| 5,248,808 | 9/1993 | Bernard et al. . |
| 5,290,842 | 3/1994 | Sasaki et al. . |
| 5,302,649 | 4/1994 | Sasaki et al. . |
| 5,304,418 | 4/1994 | Akada et al. . |
| 5,322,876 | 6/1994 | Sasaki et al. . |
| 5,354,600 | 10/1994 | Fisher et al. . |
| 5,558,913 | 9/1996 | Sasaki et al. . |

USE OF PRESSURE-SENSITIVE ADHESIVE AS A BARRIER COATING

FIELD OF THE INVENTION

The present invention relates to pressure-sensitive adhesive constructions. In particular, the present invention relates to pressure-sensitive adhesive constructions with at least two adhesive layers where one of the layers is a pressure-sensitive adhesive layer which functions as a barrier coating.

BACKGROUND OF THE INVENTION

A pressure-sensitive adhesive (PSA) construction generally comprises a facestock and at least one layer of pressure-sensitive adhesive on the facestock, as well as a release surface. If they are to be used together, the pressure-sensitive adhesive and the facestock must not excessively adversely affect one another. The existence of adverse chemical or physical reactions between the facestock and the adhesive layer reduces the stability of the construction, and may effectively prevent an otherwise desired combination of materials.

For example, rubber-based adhesive compositions are known to form good adhesive layers, which can adhere to a wide variety of substrates. However, polyolefinic materials—often used in film facestock—are generally not suitable with a wide range of rubber-based pressure-sensitive adhesives, because of swelling which occurs over time when the two are adjacent to one another. This swelling manifests itself as wrinkling of the adhesive construction and/or a loss of adhesion. To avoid the problems associated with swelling, manufacturers, especially those who use polyolefinic facestocks, are often forced to use acrylic-based adhesives.

It has been found that the swelling is caused by the migration of mobile ingredients from the rubber-based adhesive layer to the facestock. The mobile ingredients include organic molecules, such as oils, liquid resins, and tackifiers, which are often added to the rubber-based polymer during manufacture to impart desired adhesive or other properties to the composition. Certain of these relatively mobile ingredients have an affinity for polyolefinic facestock material and, if so, may migrate to the facestock. The resulting swelling of the facestock, ingredients into the facestock, leads to wrinkling of the adhesive construction and/or loss of adhesion.

Under certain circumstances, migration may also occur between mobile species contained in a facestock and an underlying adhesive layer. For example, many polyvinylchloride (PVC) facestocks contain liquid plasticizers. These mobile ingredients may migrate, over time, into an adjacent layer of adhesive. Migration of mobile ingredients from a facestock into an adhesive layer may also lead to a loss of pliability or contraction of the facestock, and a concurrent loss of adhesion, as discussed in U.S. Pat. No. 3,547,852 issued to Burke.

Thus, it is desirable to develop pressure-sensitive adhesive constructions which minimize or prevent migration of species between facestock and underlying adhesive layers, so that facestocks may be used with a wider variety of adhesive formulations, and retain a useful product stability.

SUMMARY OF THE INVENTION

There is provided in accordance with one aspect of the present invention a multi-layer adhesive construction. The adhesive construction comprises a facestock, having a barrier layer on the facestock. An adhesive layer is provided on the barrier layer. Preferably, the barrier layer comprises a pressure-sensitive adhesive, selected to minimize migration of migratory organic species from the adhesive layer to the facestock. In a preferred embodiment, the facestock comprises a polyolefin such as polyethylene, and the barrier layer comprises an acrylic based adhesive.

In accordance with another aspect of the present invention, there is provided a method of inhibiting migration of destabilizing migratory species in a multi-layer adhesive construction. The method comprises the steps of providing a facestock, and applying a barrier layer to the facestock. An adhesive layer is applied to the barrier layer, and the adhesive layer is of the type comprising at least one destabilizing migratory species. The order of application of the layers to the construction can be varied, depending upon the desired construction technique. Preferably the barrier layer comprises a pressure-sensitive adhesive which is selected to inhibit migration of the migratory species from the adhesive layer to the facestock.

In accordance with a further aspect of the present invention, there is provided a method of producing a stabilized, multi-layer pressure-sensitive adhesive construction of the type containing facestock destabilizing species in the adhesive layer. The method comprises the steps of providing a facestock, applying an acrylic based adhesive barrier layer on the facestock, and applying a rubber-based adhesive layer on the barrier layer. The order of application of the layers can be varied in accordance with the desired manufacturing technique.

In accordance with the method, the rubber-based adhesive contains migratory facestock destabilizing species therein, and the barrier layer is selected to inhibit migration of the destabilizing species from the adhesive layer to the facestock.

In accordance with a further aspect of the present invention, there is provided a preferred method of producing the constructions embodying the present invention, in which the applying steps are performed substantially simultaneously. Preferably, the method is accomplished using a dual die.

Further features and advantages of the present invention will become apparent to one of ordinary skill in the art, in view of the detailed description of preferred embodiments which follows, when considered together with the attached drawings and claims.

DETAILED DESCRIPTION OF THE PREFERRED EMBODIMENTS

The multilayer adhesive construction of the present invention will be explained by reference to the accompanying drawings.

Figure 1:
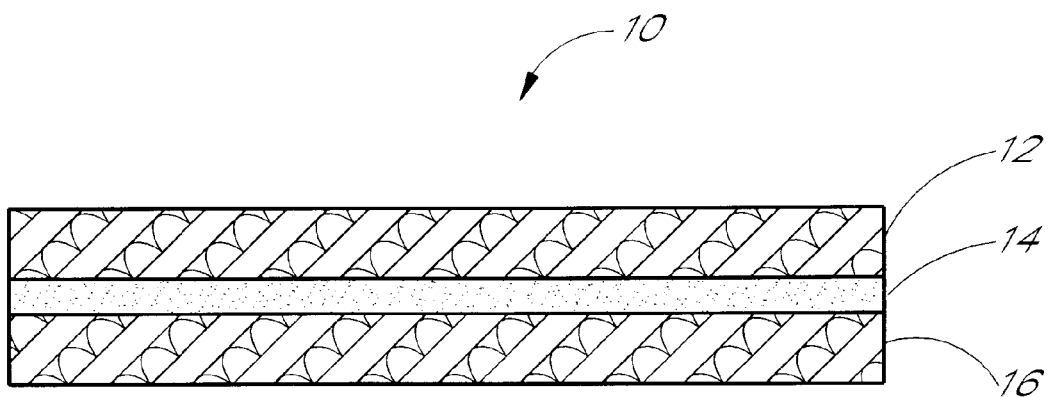
FIG. 1 is a cross-sectional view of a conventional pressure-sensitive adhesive construction.

Referring to FIG. 1, for comparison purposes, there is illustrated a cross-sectional view of a conventional pressure-sensitive adhesive construction 10. Conventional adhesive construction 10 comprises a facestock 12, an adhesive layer 14, and a release layer 16 having a release surface thereon. As will be understood by those of skill in the art, the release surface may be provided on a release layer 16 as illustrated, or on the backside of the facestock 12 in an application where the construction is intended to be rolled upon itself such as to produce an adhesive tape.

Figure 2:
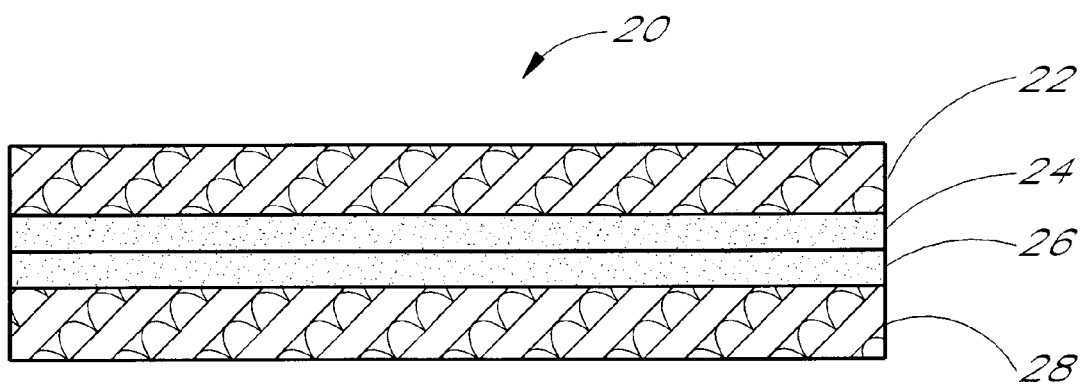
FIG. 2 is a cross-sectional view of a pressure-sensitive adhesive construction of the present invention.

Referring to FIG. 2, there is illustrated a cross-sectional view of one embodiment of a construction 20 in accordance with the present invention. Pressure-sensitive adhesive construction 20 comprises a facestock 22, a pressure-sensitive adhesive barrier layer 24, an adhesive layer 26, and a release layer 28.

Adhesive layer 26 may comprise any of a number of known adhesives, such as rubber-based adhesive compositions or acrylic-based adhesive compositions. The advantages of the present invention are optimized if the combination of materials in the construction is such that either the adhesive layer 26 contains mobile species which tend to migrate into the material of the facestock 22 or the facestock 22 contains mobile species which tend to migrate into the adhesive layer 26.

The facestock 22 of the present invention may comprise any of a variety of materials typically used as a facestock in an adhesive construction, such as paper or polymeric materials. In an optimal application of the present invention, the facestock will be of a type which experiences an adverse effect as a result of migration of species from an adhesive layer to the facestock. For example, where the adhesive layer comprises a mobile ingredient exhibiting a high affinity for polyolefinic facestock, the facestock may comprise a polyolefin, such as polyethylene, polypropylene, polybutylene, polymers of ethylene-propylene diene monomers (EPDM) or of norbornadienes, or copolymers, co-blends, or co-extrusions thereof.

The facestock 22 may alternatively comprise polar materials such as polyvinylchloride (PVC) which are known to have mobile ingredients which adversely affect certain types of adhesive layers. When the facestock contains mobile species with an affinity for underlying adhesive layers, barrier layer 24 may be chosen to minimize migration of such mobile species from the facestock.

Alternatively, the facestock 22 may comprise a paper-based material. In this embodiment, the adhesive layer 26 may contain one or more migratory species which tend to discolor, stain, or otherwise affect the facestock 22 upon migration and contact. Here, barrier layer 24 functions to minimize or prevent such facestock discoloration, staining, or other affects by inhibiting the migration of such species.

The composition and dimensional characteristics of the facestock can be readily selected by one of skill in the art in view of the intended use of the construction and desired processing parameters. For example, in a construction intended to be converted into an adhesive label, facestock composed of polyethylene having a thickness of about 100 microns and a roll width suitable for the desired processing machinery has been found to be useful.

In a presently preferred embodiment of the invention, the adhesive layer 26 comprises a rubber-based pressure-sensitive adhesive layer. For example, the rubber-based pressure-sensitive adhesive may comprise natural and/or synthetic elastomeric polymers based on synthetic or natural rubber, such as natural rubber (polyisoprene), polybutadiene, synthetic polyisoprene, random styrene-butadiene (SB) polymers, SB block copolymers, multi-armed and repeating SB copolymers. Styrene-isoprene-styrene, styrene-butadiene-styrene, styrene-butadiene, and styrene-isoprene copolymers, block, random, or multi-armed copolymers, and blends and mixtures thereof may also be used. These types of adhesives are well known in the art, as discussed in U.S. Pat. No. 5,290,842 issued to Sasaki and Ercillo, incorporated herein by reference.

Adhesives suitable for use in the adhesive layer 26 are thus exemplified by but not limited to rubber-based adhesives, which typically contain relatively mobile ingredients. The mobile ingredients of these adhesives normally consist of oils, resins, tackifiers, or other organic molecules added during the adhesive formulation process. However, as can be appreciated by one of skill in the art, such mobile ingredients may also be of natural origin or may result as a byproduct of the manufacturing process. In addition, such mobile ingredients may also result from degradation of one or more components of the adhesive formulation during processing or use.

Migration of these mobile ingredients to polyolefinic facestocks results in the adverse swelling reaction discussed previously. In addition, migration may also result in the adhesive layer losing some of its adhesive strength, since many of these mobile ingredients are added to enhance adhesion. Thus, it is generally desirable to confine migratory mobile species to their original environment within the construction.

For example, the following mobile ingredients are commonly used in rubber-based adhesive formulations, and are known to have an affinity for polyolefinic materials and to cause swelling of polyolefinic facestocks: hydrogenated aromatic resins wherein a significant portion of the benzene rings are converted to cyclohexane rings (e.g., the REGAL-REZ family of resins manufactured by Hercules of Passaic, New Jersey, and the ARKON family of resins manufactured by Arakawa Chemical of Chicago, Ill.); hydrogenated polycyclic resins (e.g., ESCOREZ 5300, 5320, 5340, and 5380 manufactured by Exxon of Irving, Tex.); and plasticizer oils (e.g., SHELLFLEX 371 manufactured by Shell of Houston, Tex., and KAYDOL mineral oil manufactured by Witco of Greenwich, Conn.). These mobile ingredients and others substantially like them tend to migrate from the adhesive layer into the polyolefinic facestock 22. In the absence of the barrier layer 24 of the present invention, this migration manifests itself as a planar swelling of the facestock, which generally results in wrinkling of the adhesive construction and/or loss of adhesion.

The coat or layer thickness (so-called "coat weight") of the adhesive layer 26 in the construction 20 can be varied widely depending upon its composition and the intended use environment as will be understood by those skilled in the art. For example, in a construction intended for conversion into an adhesive label and having a polyethylene facestock, the adhesive layer 26 may comprise an apolar rubber-based adhesive such as the adhesive described in U.S. Pat. No. 5,290,842 issued to Sasaki and Ercillo, having a weight per unit area ("coat weight") within the range of from about 2 $g/m^2$ to about 50 $g/m^2$ and preferably about 2 $g/m^2$ to about 35 $g/m^2$.

While the adhesive layer has been described in terms of a rubber-based pressure-sensitive adhesive layer, those skilled in the art will appreciate that adhesive layer 26 may be composed of adhesive types other than rubber-based adhesives. In addition, it is contemplated that adhesives which are not pressure-sensitive adhesives may serve as an appropriate adhesive layer 26, and benefit from the advantage offered by the present invention. Thus, given particular facestock material, available barrier layer materials, and the contemplated use of the adhesive construction, those skilled in the art will appreciate the variety of adhesive layers that may be used with the present invention, and will be able to select physically compatible components using a routine process of optimization by following the teachings supplied herein.

The barrier layer 24 is a pressure-sensitive adhesive layer which inhibits the migration of mobile ingredients between the facestock 22 and the adhesive layer 26. The barrier layer of the preferred embodiment of the present invention is specifically selected to inhibit migration of mobile ingredients from adhesive layer 26 into the facestock 22. Barrier layer 24 may comprise any of a number of known adhesives which exhibit a suitable barrier capability.

When apolar adhesive layers 26 are used with apolar facestocks 22, polar adhesives are preferred to act as barrier layers 24 in multilayer adhesive constructions of the present invention. For example, when adhesive layer 26 comprises a rubber-based adhesive composition, and is used with polyolefinic facestock, acrylic-based adhesives compositions are preferred to act as barrier layers 24 in multilayer adhesive constructions of the present invention.

The preferred acrylic-based pressure-sensitive adhesives comprise polymers of acrylic monomers, polymers of methacrylic monomers, and copolymers, blends, or mixtures thereof, which may include smaller amounts of non-acrylic monomers such as vinyl acetate and other vinyl esters, styrene and substituted styrenes, fumarates, maleates, vinyl lactams, and any other olefinic unsaturated monomers which copolymerize with acrylate and methacrylate. For example, polymers of the following monomers, and copolymers, blends, or mixtures thereof may also be used to form suitable barrier layers: methyl acrylate, ethyl acrylate, n-propyl acrylate, isopropyl acrylate, n-butyl acrylate, isobutyl acrylate, n-amyl acrylate, isoamyl acrylate, n-hexyl acrylate, isohexyl acrylate, cyclohexyl acrylate, isooctyl acrylate, 2-ethyl hexyl acrylate, decyl acrylate, lauryl acrylate, stearyl acrylate, isobornyl acrylate, methyl methacrylate, ethyl methacrylate, n-propyl methacrylate, isopropyl methacrylate, n-butyl methacrylate, isobutyl methacrylate, n-amyl methacrylate, isoamyl methacrylate, n-hexyl methacrylate, isohexyl methacrylate, cyclohexyl methacrylate, isooctyl methacrylate, 2-ethyl hexyl methacrylate, decyl methacrylate, lauryl methacrylate, stearyl methacrylate, and isobornyl methacrylate.

The presently preferred acrylic pressure-sensitive adhesives for use in the barrier layer are thermoplastic acrylic polymer resins available from Schenectady International Inc. of Schenectady, N.Y., such as HRJ-4527, HRJ-10753, and HRJ-12531. Acrylic-based polymer resins may be applied using a variety of techniques, most preferably as a 100% solid via hot melt, solvent, or emulsion coating, or as a syrup followed by irradiation polymerization, or by any other means known to those of skill in the art. In addition, these polymer compositions may be used in their commercially available form, or as modified with physically compatible plasticizers and tackifiers, such as rosin-based, hydrocarbon, or terpene-phenolic resins.

Although the present invention has been described in terms of an acrylic based barrier layer, it is contemplated that other polymeric compositions which inhibit the migration of at least one species between facestock 22 and adhesive layer 26 are suitable to function as a barrier layer 24 in the present invention.

Generally, the choice of components of the barrier layer 24 will depend, in large part, on the polarity and solubility parameter characteristics of the facestock 22 and adhesive layer 26. Given these values for a particular facestock 22 and a particular adhesive layer 26, a suitable barrier layer 24 may be determined by those skilled in the art by routine optimization.

The physical and chemical properties of the barrier layer 24 are chosen so as to optimize inhibition of migration of mobile ingredients, and also to select for certain, desirable adhesive properties. The solubility parameter ($\delta$) and the polarity of the barrier layer 24, when compared to the properties of the adhesive layer, its mobile ingredients, and the facestock 22, can be used to predict if a particular barrier layer will inhibit migration of a particular mobile species.

The solubility parameter ($\delta$) is defined herein as the square root of cohesive energy density ($E_{coh}$) and is expressed in units of $J^{1/2}/cm^{3/2}$. The cohesive energy density ($E_{coh}$) and, therefore, the solubility parameter ($\delta$), may be determined by routine experimentation by those skilled in the art. For example, these values may be determined from the heat of vaporization. The solubility parameter ($\delta$) is a physical characteristic of the polymer component of an adhesive composition, as may be found in readily available references known to those of skill in the art.

The typical components of the barrier layer formed from acrylic polymer compositions exhibit solubility parameters between 17.8 and 26.2 $J^{1/2}/cm^{3/2}$. For example, poly(ethyl acrylate) solubility parameter ranges from 18.8 to 19.2, poly(butyl acrylate) solubility parameter ranges from 18.0 to 18.6, poly(isobutyl acrylate) solubility parameter ranges from 17.8 to 22.5, poly(methyl methacrylate) solubility parameter ranges from 18.6 to 26.2.

Preferably, barrier layer 24 components exhibit solubility parameters substantially different than those of the components of adhesive layer 26. Thus, for example, if adhesive layer 26 has a solubility parameter similar to that of polyethylene, 15.8 to 17.1 $J^{1/2}/cm^{3/2}$, then a polymer with a slightly higher solubility parameter, such as poly(butyl acrylate), with a solubility parameter of 18.0 to 18.6 $J^{1/2}/cm^{3/2}$, may be chosen as the barrier layer 24 polymer component.

The barrier layer 24 must have sufficient pressure-sensitive adhesive properties to be capable of binding to the facestock 22, and to adhesive layer 26. The glass transition temperature, Tg, of the barrier layer, as well as the loss modulus and storage modulus of the barrier layer, may be used to determine if the barrier layer 24 functions properly as a pressure-sensitive adhesive layer. Likewise, the glass transition temperature, Tg, of the adhesive layer, as well as its loss modulus and storage modulus, may be used to determine if the adhesive layer 26 functions properly as an adhesive. To function as a pressure-sensitive adhesive layer, the glass transition temperature of the polymeric component of barrier layer 24 and adhesive layer 26 should generally be about 50° C. below the contemplated use temperature, and preferably no less than about 10° C. below the contemplated use temperature.

The blocking function of the barrier layer 24 may also be affected by the relative coat weight (or thickness) of the layer 24 with respect to the coat weight of the adhesive layer 26. In addition, the relative concentration of mobile species in the adhesive layer 26 may set minimum limits on the coat weight of the barrier layer 24 in order to maintain a useful product life. In general, an inadequate barrier layer 24 may not sufficiently inhibit migration. On the other hand, too great a relative coat weight in the barrier layer may tend to increase cost, may detrimentally affect the conversion process, may adversely affect adhesive properties, and may otherwise adversely affect the construction of the present invention.

According to the adhesive construction of the present invention, when constructed using the preferred, multilayer method discussed infra, the combined weight per unit area (the "coat weight" or thickness) of the combined layers of adhesive (i.e., the adhesive layer and the barrier layer) will generally be within the range of about 4 g/m$^2$ to about 100 g/m$^2$. The combined coat weight of the layers of adhesive may be as large as approximately 200 g/m$^2$ in presently envisioned embodiments of the invention. The coat weight of each individual layer of the present invention (i.e., the adhesive layer or the barrier layer) will generally be within the range of about 2 g/m$^2$ and about 50 g/m$^2$. Coat weights for each individual layer may be as large as approximately 100 g/m$^2$ in presently envisioned embodiments of the invention. Presently, coat weights of individual layers ranging from approximately 15 g/m$^2$ to approximately 35 g/m$^2$ have been tested, but lighter coat weights for the barrier layer, of about 2 g/m$^2$ to 15 g/m$^2$, according to the above-mentioned parameters, are also envisioned.

In a construction intended for adhesive label use, having a facestock 22 comprising polyethylene and a pressure-sensitive adhesive layer 26 comprising a rubber-based adhesive, the coat weight of the barrier layer 24 will generally be within the range from about 2 g/m$^2$ to about 40 g/m$^2$, and, preferably, within the range of from about 10 g/m$^2$ to about 30 g/m$^2$. However, thicknesses outside of these ranges may be optimal for certain applications, as can be determined through routine optimization experimentation by those skilled in the art.

In general, the ratio of coat weight between the barrier layer 24 and adhesive layer 26 will be on the order of 1:1. Because the barrier layer acts as a physical barrier to inhibit migration of mobile species, relatively thin barrier layers may serve to inhibit migration of some mobile ingredients. Considerations regarding cost, the chemical composition and physical characteristics of the facestock and each layer of adhesive, the intended use, and the ultimately desired adhesive properties will determine, for those skilled in the art, the appropriate ratio of coat weights for the adhesive layer and the barrier layer. Determining an appropriate ratio of the barrier layer 24 to adhesive layer 26 for a specific set of chemical components, and with a given intended use for the construction, can be readily determined through routine optimization experiments by those skilled in the art.

Although as a preferred embodiment, acrylic-based PSAs are used for the barrier layer 24 in a construction having a rubber-based PSA layer 26 and a polyolefinic facestock 22, other constructions can be effective as well.

In general, when the production of the adhesive construction is driven by the choice of facestock material, appropriate adhesive layer compositions and barrier layer compositions are then selected. The general adhesive properties of the adhesive layer are most relevant in its selection. An optimal pairing of adhesive layer and facestock, however, often has mobile ingredients with high affinity for the facestock. For this reason, the barrier layer and its components are selected to provide adequate adhesion to the facestock 22 and adhesive layer 26, so that a stable integral construction may be formed, but preferably with sufficiently different solubility parameter ($\delta$) from the mobile ingredients of either the adhesive layer or the facestock, to inhibit migration of the mobile species. As discussed supra the glass transition temperature, Tg, of each layer of adhesive and its loss modulus and storage modulus must also be considered to ensure adequate adhesive properties. Also, considerations of cost, the relative migration rate of the mobile ingredients, the adverse effects of swelling manifested in a particular construction, and the intended use, will determine the choice of adhesive layer and barrier layer arising out of limited choice of facestock materials.

The present invention can be manufactured in accordance with many methods well known to those of ordinary skill in the multilayer coating art. Two or more layers can be applied to an appropriate substrate by, for example, separately coating each layer to different substrates, drying the multiple coatings, and then laminating them together to form an integral product. Alternatively, two adhesive layers can be sequentially coated onto the facestock. Other known methods of simultaneous or near-simultaneous coating include slide coating, multilayer die coating, or die/slide combination coating.

Figure 3:
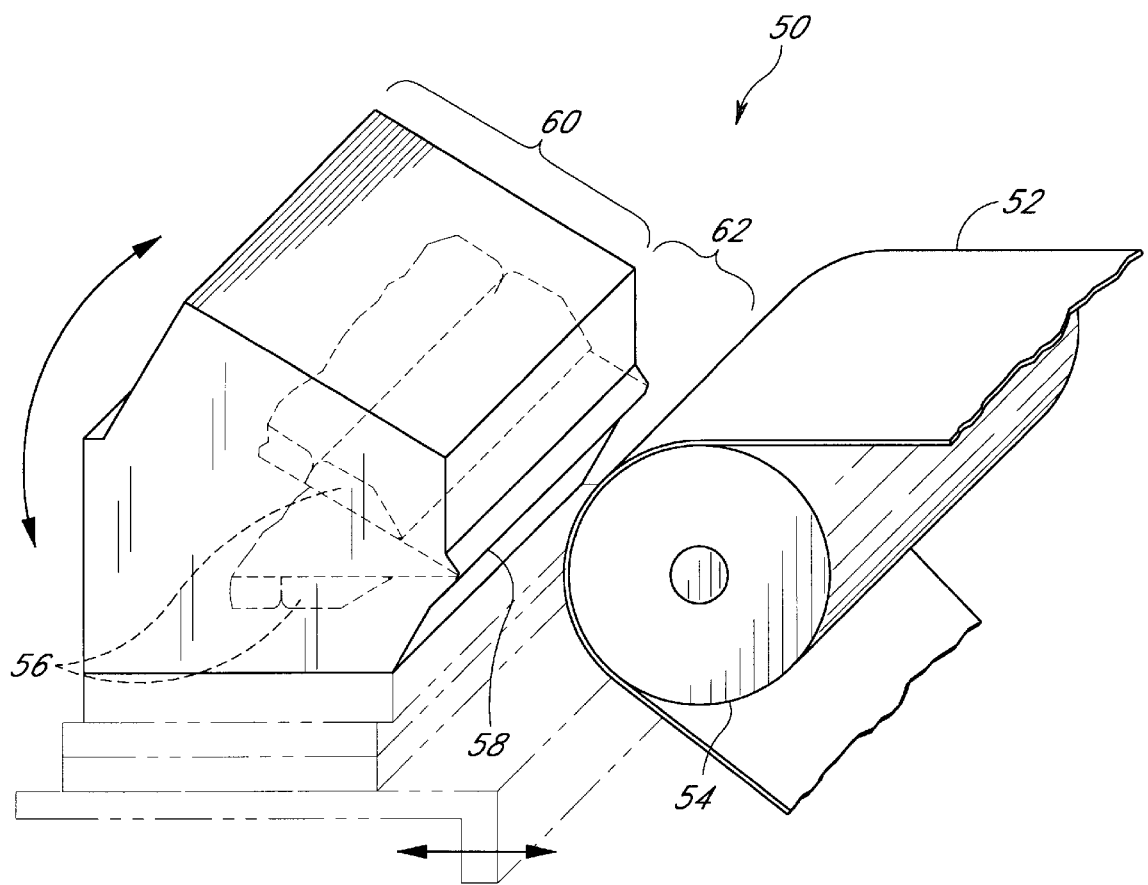
FIG. 3 is a schematic diagram of a dual die used to apply the adhesive formulations of the present invention.

One preferred method of manufacture uses a multilayer die 50 such as that illustrated in FIG. 3. Although the die shown in FIG. 3 illustrates the application of two coating layers to a substrate 52, it will be understood that the principles of this method are equally applicable to a plurality of layers in addition to two. In accordance with standard practice, the substrate, which in this case preferably comprises silicone coated paper, is referred to as a "web" and is formed into a long roll. The web 52 travels around a back-up roll 54 as it passes the distal end of the multilayer die 50. As shown in FIG. 3, it will be understood that both the die 50 and the web 52 have substantially equal width such that the entire width of the substrate is coated in one pass by the fluid flowing out of the die 50 and onto the web 52. In this case, two separate fluid layers are flowing out of manifolds 56 formed in the die and along individual slots 60 which are defined by the die's distal lands 62. The slots 50 each communicate with the interface between the web 52 and the distal most tips 58 of the die 50. These tips are referred to as the "die lips" 58 and are illustrated and described in more detail in connection with FIG. 4 below.

Figure 5:
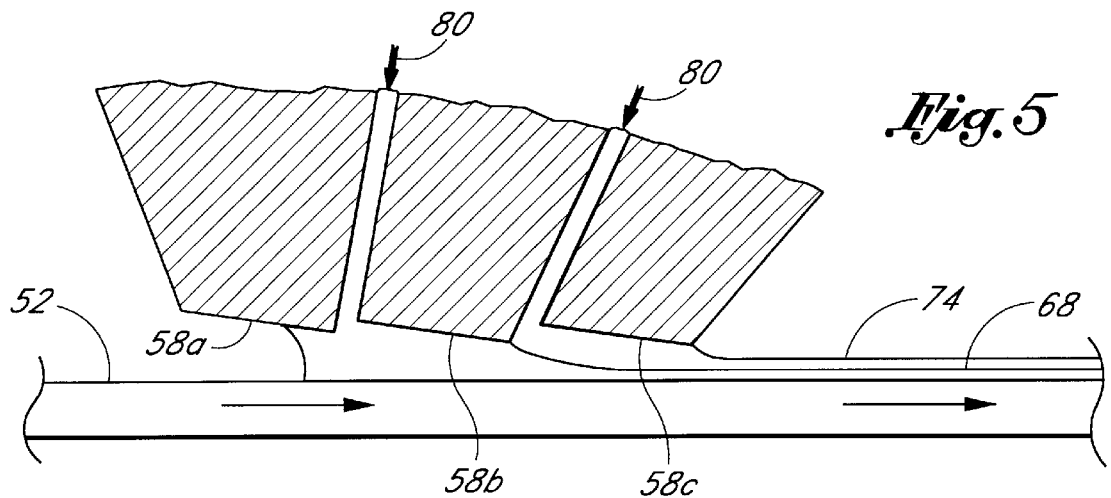
FIG. 5 is a cross-sectional schematic showing an angled lip structure of the dual die as it is applying two layers of adhesive.

The multilayer die 50 is modular, thus allowing for variations in the individual slots 60 and lip 58 configurations without necessitating modifications to the other slots and lips. Thus, these geometries can be adjusted in order to achieve successful coating. Other variables include the "coating gap" (c.g.) and the "angle of attack" (a) of the die. As illustrated in FIG. 3, the coating gap is the distance that the lips 58 are set back from the web. The angle of attack (a) is the degree of angular adjustment of the lip surfaces and of the entire die with respect to the outer pointing normal of the web as illustrated in FIG. 5. Another variable is the web speed which may vary between 50–1,000 feet per minute, and more.

Either one of two die coating methods may be utilized: interference coating or proximity coating. In the former case, the lips 58 of the die actually are pressed forward in the direction of the web 52, but do not contact the web nor cause any damage thereto, because they hydroplane on a thin layer of coating material. However, the pressure may actually cause the back-up roll 54 (typically constructed from a hard rubber material) to deform in order to relieve the pressure of the die against the lips 58. In proximity coating, the lips 58 of the die 50 are positioned a precise distance from the web 52 and are not pressed forward toward the web. The back-up roll 54 is typically constructed from a stainless steel material which allows for precision in the circumference of the roll and minimizes roll run-out. The method described herein can be successfully utilized with either type of coating technique.

Thus, since very thin layers of high viscosity adhesives are being coated at relatively high web speeds, the process must be carefully controlled.

Figure 4:
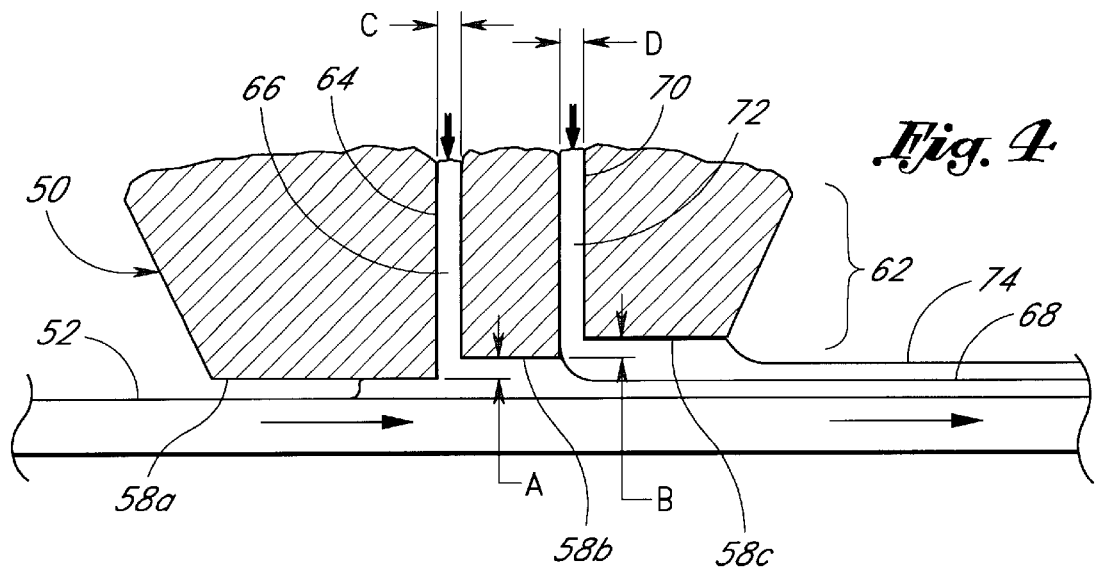
FIG. 4 is a cross-sectional schematic view showing the lip structure of the dual die of FIG. 3 as it is applying two layers of adhesive.

Such control is accomplished with the present multilayer die coating technique, in part due to the geometry and configuration of the die lips 58. Referring to FIG. 4, there is shown a close-up view of the distal most tips 62 of the multilayer die of FIG. 3, including the lips 58 associated with each slot, showing the interface or coating gap with respect to the web 52. With respect to FIG. 4, it should be noted that, for ease of illustration, the die 50 is shown rotated 90° from the position shown in FIG. 3. Moreover, the web 52 is shown in a horizontal arrangement, when in actuality, there may be a slight curvature to the web 52 and back-up roll (not shown) at this point; however, the distances involved are so short that a good approximation of the fluid dynamics can be achieved by assuming a horizontal web 52.

For consistent reference, the individual lips 58 of the multilayer die 50 shall be referred to with respect to the direction of travel of the web 52. For example, the lip 58a shown to the left in FIG. 4 will be referred to as the "upstream lip", while the right-most lip 58c shall be referred to as the "downstream lip". Thus, the "middle lip" 58b will have that same reference. Accordingly, the upstream and middle lips 58a, 58b define an upstream feed gap 64 through which an adhesive material 66 flows onto the web 52 to form a bottom adhesive layer 68 of a multilayer adhesive product. Likewise, the middle lip 58b and the downstream lip 58c together form a slotted feed gap 70 through which adhesive 72 flows onto the top of the lower layer 68 as the web travels in left-to-right direction, as illustrated in FIG. 4. This forms a top adhesive layer 74 of the multilayer adhesive product. Again, for ease of illustration, the top layer 74 is shown as a darker-colored material, but this may not necessarily be the case in actual production; for instance, various colors or tags such as ultra-violet fluorescent dye may be utilized to facilitate measurement of individual layer thicknesses.

Coating of viscous adhesives at these web speed rates can involve a number of problems. For example, recirculation in the flow of either the bottom or top adhesive layers can result in certain defects in the final multilayer product. Such recirculations may occur if the separation point of either liquid adhesive with respect to the die lips 58 occurs at an inappropriate location. In addition, extreme pressure gradient can result in the upstream leakage of liquid out of the coating gap area, again causing defects in the end product due to nonuniform adhesive layer thicknesses, etc. Moreover, these and other maleffects result in the diffusion of one layer in the other, since they are being coated simultaneously in the liquid state. Such diffusing jeopardizes the integrity and performance of the resulting product.

Thus, it has been found, with respect to the multilayer die coating described herein, that it is very important to control the pressure gradients of the adhesives under each lip. In particular, the top layer should separate from the middle lip at the downstream corner of this lip. In order to achieve such coating control, it will be noted from FIG. 4 that the lips 58 of each die section are stepped or spaced away from the web 52 in the downstream direction. This allows the lips to generate the appropriate pressure gradient and to ensure smooth flow of the adhesive and uniform layer thicknesses. The adjustment of a number of run parameters are necessary in order to achieve this goal. For example, the coating gaps at lip 58b and 58c should be approximately in the range of one to three times the compounded wet film thicknesses of the layers being fed from upstream of said lip. Under the upstream lip 58a, the net flow rate is necessarily zero, and a turn-around flow is the only possibility. Thus, the coating gap under this lip is solely set in order to avoid leakage of the liquid out from the coating gap in the upstream direction. Moreover, the upstream step, defined as dimension A in FIG. 4, and the downstream step, defined as dimension B, may range anywhere from zero to four mils (0.0 inches to 0.004 inches). The feed gaps (defined as dimensions C and D in FIG. 4) can also be adjusted anywhere between one and fifteen mils (0.001 inches to 0.015 inches), preferably not to exceed five times the wet film thickness of their correspondent layers. In addition, the length of the lips 58 in the direction of web travel play an important role in achieving the proper pressure gradient. Thus, the upstream lip 58a should be approximately two millimeters in length, or more, as necessary to seal the head as noted above. The downstream lip 58c and middle lip 58b may fall within the range of 0.1–3 mm in length.

It will be recognized that one of ordinary skill in the art can adjust these various parameters in order to achieve the proper fluid dynamics for uniform layer coating. Of course, persons of more than ordinary skill can adjust the die and run parameters more precisely in order to achieve good results. However, such persons are not always readily available in production settings. Therefore, it is advantageous to provide a die geometry which will increase the size of the window of successful multilayer coating operation. This can be achieved by certain adjustments in the orientation of the die lips.

Thus, FIG. 5 illustrates the die 50 of FIG. 4 rotated slightly in the clockwise direction representing an "angle of attack $\alpha$. For consistent reference, the angle of attack ($\alpha$) shown in FIG. 5 represents a negative angle of attack, or a "converging" orientation of the downstream lip 58c with respect to the web 52. This converging lip orientation provides a negative pressure gradient (in the direction of web travel), along the downstream lip 58c, which is beneficial in preventing a coating defect well known as "ribbing," a pattern of regular striation in the sense of the web travel in the film. The fact that the middle and the upstream lips 58a and 58c also achieve a convergent orientation is not particularly beneficial. Although the angle of attack of the die can be varied widely in order to achieve these advantages, it has been found that angles in the rate of 0° to −5° are appropriate.

Figure 6:
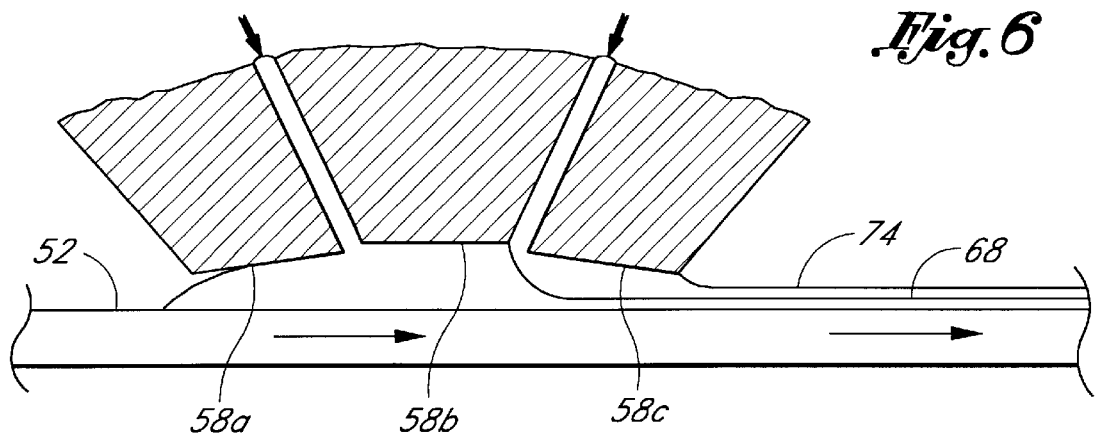
FIG. 6 is a cross-sectional schematic of a dual die featuring a beveled lip structure.

An even further successful operating window can be achieved with additional lip modifications. Shown in FIG. 6 is a variation of the lip configuration of FIG. 5, illustrating "beveled" lips. In this configuration, the downstream lip 58c is angled or beveled to as to have a converging profile, similar to that shown in FIG. 5. However, the middle lip 58b is positioned so as to be flat or parallel with respect to the web 52. The upstream lip 58a, on the other hand, is beveled so that it is diverging from the web 52 in the downstream direction. This configuration, again, provides the appropriate pressure gradient under the individual lips to avoid recirculations and upstream leakage. Moreover, if perturbations in the coating conditions occur (such as, for example, due to roll run-out, foreign objects on the web, variations in ambient pressure, etc.), the converging configuration of the upstream lip 58a shown in FIG. 6 will produce a dampening effect on flow conditions so that defects in the coating layers do not occur. In this manner, the multilayer coating bead acts as a nonlinear spring to dampen out such unwanted events in order to return to steady state. The die 50 can then be adjusted in accordance with standard angle of attack variations to achieve favorable coating conditions. Because the lips 58 are pre-disposed or beveled in a favorable orientation, the adjustment of angle of attack, as well as coating gap, need not be so precise. Thus, persons of ordinary skill or even less skill can successfully achieve good coating results.

The examples which follow serve to demonstrate that the barrier layer of the preferred embodiment of the present invention inhibit the migration of mobile ingredients from the adhesive layer into the facestock.

EXAMPLE 1 and CONTROL 1

In the first example used to demonstrate the invention, HRJ-12531, an acrylic-based pressure-sensitive adhesive purchased from Schenectady International, Inc., was used as a barrier layer, polyethylene (PE-100 film) was used as a facestock, and a rubber-based pressure-sensitive adhesive (RB-PSA) of the type disclosed in U.S. Pat. No. 5,290,842 issued to Sasaki and Ercillo was used as an adhesive layer.

A barrier layer solution of HRJ-12531 (41.6% by weight in toluene) was coated on a 0.003 inch thick Rhinelander A-48 release liner using a 0.005 inch steel spacer. The solvent was driven off by heating the construction in an oven, leaving an HRJ-12531 barrier layer of 15.6 g/m$^2$. This barrier layer/release liner construction (HRJ-12531/A-48) was then laminated on a polyethylene (PE-100) film to form a PE-100/HRJ-12531/A-48 construction.

An adhesive layer solution of RB-PSA (60% by weight in toluene) was coated on a 0.003 inch thick Rhinelander A-48 release liner using a 0.0045 inch steel spacer. The solvent was driven off by heating the construction in an oven, leaving a RB-PSA layer of 19.4 g/m$^2$, as part of a adhesive layer/release liner construction (RB-PSA/A-48).

The adhesive layer/release liner construction was laminated against the PE-100/HRJ construction to yield a PE-100/HRJ-12531/RB-PSA/A-48 multilayer adhesive construction of the present invention. Small sections (nine of approximately 1 inch ×8 inches) of the PE-100/HRJ-12531/RB-PSA/A-48 were set aside for peel, looptack, and static shear tests as described below. Six 10 inch ×10 inch sections from this construction were then laminated against each other to form three sandwich constructions with the following layer construction: PE-100/HRJ-12531/RB-PSA/HRJ-12531/PE-100. The sandwich constructions were then used to conduct swell test experiments against previously run controls, consisting of similarly prepared sandwich construction with no barrier layers: PE-100/HRB-PSA/PE-100.

The PE-100/HRJ-12531/RB-PSA/HRJ-12531/PE-100 sandwich constructions, as well as the control PE-100/RB-PSA/PE-100 sandwich constructions, were left at 50° C. for one week. The change in the length of each side of each sandwich construction of the present invention after one week is presented in Tables I-III; the change in the length of each side of the control constructions after one week and after two weeks is presented in Tables IV-VI. In Tables I-III, the changes in the length of each side of the PE-100/HRJ-12531/RB-PSA/HRJ-12531/PE-100 sandwich constructions after a second week at 50° C. is also reported.

The PE-100/HRJ-12531/RB-PSA/A-48 sections exhibited no sign of wrinkling as is often observed with an adhesive construction not including a barrier layer. The following objective tests of the adhesive properties of the preferred embodiment of the present invention were conducted substantially in accordance with the protocols presented in *Test Methods for Pressure Sensitive Tapes*. The Pressure Sensitive Tape Council, 1992 (PSTC): 180° peel test, looptack test, and static shear test. In particular, the peel test was conducted substantially in accordance with protocol appearing at PSTC-1, the looplack test, with the modifications as described below, as appearing at PSTC-5, and the static shear test, with the protocol appearing at PSTC-7. The results of these tests indicate that these adhesive constructions exhibited adhesive properties suitable for a wide range of applications.

As described in the 180° peel test protocol, three 1 inch ×8 inch strips were rolled down on stainless steel test panels with a 4.5 lbs. rubber clad roller, once back and forth at a rate of 12 inches per minute. After waiting 12 minutes at laboratory conditions, the test strip was peeled away from the panel and parallel to the panel surface at 12 inches per minute. The force to remove the test strip from a stainless steel panel was found to be 630±110 N/m and the force to remove the test strip from a polyethylene panel was found to be 406±18 N/m.

In the looptack test protocol, three 1 inch ×8 inch strips of the adhesive construction were formed into loops and each brought into contact with a straight stainless steel tests panel at a rate of 12 inches per minute, with no additional pressure being applied. The loop was then peeled from the panel at 12 inches per minute. The force to remove the adhesive loop was found to be 680±150 N/m.

As described in the static shear test protocol, three 0.5 inch ×2 inch test strips of the adhesive construction were applied on stainless steel test panels with overlaps of 0.5 inches by 0.5 inches. The sample (contact) portions of the test panels were rolled down with a 4.5 lbs. rubberclad steel roller, once back and forth at a rate of 12 inches per minute. After the free end of the strip was folded back on itself, a small hole was made in the free end and a 1000 gm weight was loaded on that hole. The weight was supported for 22 minutes.

The data of Tables I-III indicate that after one week at 50° C., the multilayer adhesive constructions of this embodiment of the present invention averaged percent swells of 0.68, 0.80, 0.68 and 0.85 along, respectively, sides A, B, C, and D. (According to the naming convention, sides A and C were parallel, as were sides B and D.) In contrast, as presented in Tables IV–VI, the control multilayer adhesive constructions (with no barrier layer) averaged percent swells of 1.3, 0.87, 1.3, and 0.93 along, respectively, sides A, B, C, and D after one week at 50° C., nearly twice the degree of swelling observed in the adhesive construction of the present invention.

The data of Tables I–III and IV–VI also indicate that after two weeks at 50° C., the multilayer adhesive constructions of the present invention averaged percent swells of only 0.78, 0.85, 0.78 and 0.87 along, respectively, sides A, B, C, and D, also nearly one-half the percent swells observed for the control constructions after two weeks at 50° C.: 1.4, 0.97, 1.4, and 0.97 along sides A, B, C, and D, respectively (Table IV–VI).

TABLE I

TRIAL #1 SWELL TEST DATA
PE-100/HRJ-12531/RB-PSA/HRJ-12531/PE-100

| | INITIAL LENGTH (inch) | ONE WEEK LENGTH | % SWELL | TWO WEEKS LENGTH | % SWELL |
|---|---|---|---|---|---|
| A | 10.010 | 10.075 | +0.65 | 10.085 | +0.75 |
| B | 10.010 | 10.090 | +0.80 | 10.095 | +0.85 |
| C | 10.000 | 10.065 | +0.65 | 10.070 | +0.70 |
| D | 10.000 | 10.080 | +0.80 | 10.085 | +0.85 |

TABLE II

TRIAL #2 SWELL TEST DATA
PE-100/HRJ-12531/RB-PSA/HRJ-12531/PE-100

| | INITIAL LENGTH (inch) | ONE WEEK LENGTH | % SWELL | TWO WEEKS LENGTH | % SWELL |
|---|---|---|---|---|---|
| A | 10.010 | 10.080 | +0.75 | 10.090 | +0.80 |
| B | 10.010 | 10.090 | +0.80 | 10.100 | +0.90 |
| C | 10.000 | 10.075 | +0.75 | 10.090 | +0.90 |
| D | 10.005 | 10.095 | +0.90 | 10.095 | +0.90 |

TABLE III

TRIAL #3 SWELL TEST DATA
PE-100/HRJ-12531/RB-PSA/HRJ-12531/PE-100

| | INITIAL LENGTH (inch) | ONE WEEK LENGTH | % SWELL | TWO WEEKS LENGTH | % SWELL |
|---|---|---|---|---|---|
| A | 10.005 | 10.070 | +0.65 | 10.085 | +0.80 |
| B | 10.010 | 10.090 | +0.80 | 10.090 | +0.80 |
| C | 9.995 | 10.060 | +0.65 | 10.070 | +0.75 |
| D | 10.010 | 10.095 | +0.85 | 10.095 | +0.85 |

TABLE IV

CONTROL #1 SWELL TEST DATA
PE-100/RB-PSA/PE-100

| | INITIAL LENGTH (inch) | ONE WEEK LENGTH | % SWELL | TWO WEEKS LENGTH | % SWELL |
|---|---|---|---|---|---|
| A | 10.010 | 10.150 | +1.40 | 10.160 | +1.50 |
| B | 10.010 | 10.100 | +0.90 | 10.110 | +1.00 |
| C | 10.010 | 10.140 | +1.30 | 10.150 | +1.40 |
| D | 10.020 | 10.110 | +0.90 | 10.110 | +0.90 |

TABLE V

CONTROL #2 SWELL TEST DATA
PE-100/RB-PSA/PE-100

| | INITIAL LENGTH (inch) | ONE WEEK LENGTH | % SWELL | TWO WEEKS LENGTH | % SWELL |
|---|---|---|---|---|---|
| A | 10.010 | 10.080 | +1.30 | 10.090 | +1.40 |
| B | 10.010 | 10.090 | +0.80 | 10.100 | +0.90 |
| C | 10.000 | 10.075 | +1.30 | 10.090 | +1.40 |
| D | 10.005 | 10.095 | +0.90 | 10.095 | +1.00 |

TABLE VI

CONTROL #3 SWELL TEST DATA
PE-100/RB-PSA/PE-100

| | INITIAL LENGTH (inch) | ONE WEEK LENGTH | % SWELL | TWO WEEKS LENGTH | % SWELL |
|---|---|---|---|---|---|
| A | 10.005 | 10.070 | +1.30 | 10.085 | +1.30 |
| B | 10.010 | 10.090 | +0.90 | 10.090 | +1.00 |
| C | 9.995 | 10.060 | +1.20 | 10.070 | +1.40 |
| D | 10.010 | 10.095 | +1.00 | 10.095 | +1.00 |

EXAMPLE 2

In a second example used to demonstrate the invention, HRJ-4527, an acrylic-based pressure-sensitive adhesive purchased from Schenectady International, Inc. was used as a barrier layer, polyethylene (PE-100 film) was used as a facestock, and RB-PSA was used as an adhesive layer.

A barrier layer solution of HRJ-4527 (35% by weight in toluene) was coated on a 0.003 inch thick Rhinelander A-48 release liner using a 0.006 inch steel spacer. The solvent was driven off by heating in an oven, leaving an HRJ-4527 barrier layer of 17.2 g/m$^2$. This barrier layer/release liner construction (HRJ-4527/A-48) was then laminated on a polyethylene (PE-100) film to form a PE-100/HRJ-4527/A-48 construction.

An adhesive layer solution of RB-PSA (60% by weight in toluene) was coated on a 0.003 inch thick Rhinelander A-48 release liner using a 0.006 inch steel spacer. After the solvent was driven off by heating in an oven, a RB-PSA layer of 27.6 g/m$^2$ remained, as part of a adhesive layer/release liner construction (RB-PSA/A-48).

The adhesive layer/release liner construction was laminated against the PE-100/HRJ-4527 construction to yield a PE-100/HRJ-4527/RB-PSA/A-48 multilayer adhesive construction. Four 10 inch ×10 inch sections from this construction were then laminated against each other to form two sandwich constructions of the following layer construction: PE-100/HRJ-4527/RB-PSA/HRJ-4527/PE-100. These two sandwich constructions were then used to conduct swell test experiments against controls, similarly prepared sandwich constructions with no barrier layer: PE-100/RB-PSA/PE-100 (Tables IV–VI).

The PE-100/HRJ-4527/RB-PSA/HRJ-4527/PE-100 sandwich constructions were left at 50° C. for one week. The changes in the length of each side of each sandwich construction after one week are presented in Tables VII and VIII.

The data of Tables VII and VIII indicate that after one week at 50° C., the multilayer adhesive constructions averaged percent swells of 0.70, 0.73, 0.75 and 0.73 along, respectively, sides A, B, C, and D. In contrast, the control (with no barrier layer) adhesive constructions averaged percent swells of 1.3, 0.87, 1.3, and 0.93 along, respectively, sides A, B, C, and D, as disclosed in Table IV–VI, nearly twice the degree of swelling observed in the adhesive construction of the present invention.

TABLE VII

TRIAL #1 TEST DATA
PE-100/HRJ-4527/RB-PSA/HRJ-4527/PE-100

| | INITIAL | ONE WEEK | |
|---|---|---|---|
| | LENGTH (inch) | LENGTH | % SWELL |
| A | 10.005 | 10.075 | +0.70 |
| B | 10.020 | 10.090 | +0.70 |
| C | 10.010 | 10.075 | +0.65 |
| D | 10.010 | 10.080 | +0.70 |

TABLE VIII

TRIAL #2 TEST DATA
PE-100/HRJ-4527/RB-PSA/HRJ-4527/PE-100

| | INITIAL | ONE WEEK | |
|---|---|---|---|
| | LENGTH (inch) | LENGTH | % SWELL |
| A | 10.005 | 10.075 | +0.70 |
| B | 10.015 | 10.090 | +0.75 |
| C | 10.015 | 10.100 | +0.85 |
| D | 10.015 | 10.090 | +0.75 |

EXAMPLE 3

In the third example used to demonstrate the invention, HRJ-10753, an acrylic-based pressure-sensitive adhesive purchased from Schenectady International, Inc., was used as a barrier layer, polyethylene (PE-100 film) was used as a facestock, and RB-PSA was used as an adhesive layer.

A barrier layer solution of HRJ-10753 (55% by weight in toluene) was coated on a 0.003 inch thick Rhinelander A-48 release liner using a 0.0045 inch steel spacer. After the solvent was driven off by heating in an oven, an HRJ-10753 barrier layer of 19.4 g/m$^2$ remained. This barrier layer/release liner construction (HRJ-10753/A-48) was then laminated on a polyethylene (PE-100) film to form a PE-100/HRJ-10753/A-48 construction.

An adhesive layer solution of RB-PSA (60% by weight in toluene) was coated on a 0.003 inch thick Rhinelander A-48 release liner using a 0.0065 inch steel spacer. After the solvent was driven off by heating in an oven, a RB-PSA layer of 34.7 g/m$^2$ remained, as part of a adhesive layer/release liner construction (RB-PSA/A-48).

The adhesive layer/release liner construction was laminated against the PE-100/HRJ-10753 construction to yield a PE-100/HRJ-10753/RB-PSA/A-48 multilayer adhesive construction of the present invention. Six approximately 10 inch ×10 inch sections from this construction were then laminated against each other to form three sandwich constructions: PE-100/HRJ-10753/RB-PSA/HRJ-10753/PE-100. The sandwich constructions were used to conduct swell test experiments against the control, similarly prepared sandwich construction with no barrier layer: PE-100/RB-PSA/PE-100.

Each PE-100/HRJ-10753/RB-PSA/HRJ-10753/PE-100 sandwich construction was left at 50° C. for one week. The changes in the length of each side of each sandwich construction after one week are presented in Tables IX–XI.

The data of Tables IX–XI indicate that after one week at 50° C., the multilayer adhesive constructions averaged percent swells of 0.67, 0.72, 0.75 and 0.72 along, respectively, sides A, B, C, and D. In contrast, the control multilayer adhesive constructions (with no barrier layer) averaged percent swells of 1.3, 0.87, 1.3, 0.93 along, respectively, sides A, B, C, and D, as disclosed in Tables IV–VI, nearly twice the degree of swelling observed in the adhesive construction of the present invention.

TABLE IX

TRIAL #1 TEST DATA
PE-100/HRJ-10753/RB-PSA/HRJ-10753/PE-100

| | INITIAL | ONE WEEK | |
|---|---|---|---|
| | LENGTH (inch) | LENGTH | % SWELL |
| A | 10.010 | 10.090 | +0.85 |
| B | 10.015 | 10.080 | +0.65 |
| C | 10.015 | 10.090 | +0.75 |
| D | 10.015 | 10.080 | +0.65 |

TABLE X

TRIAL #2 TEST DATA
PE-100/HRJ-10753/RB-PSA/HRJ-10753/PE-100

| | INITIAL | ONE WEEK | |
|---|---|---|---|
| | LENGTH (inch) | LENGTH | % SWELL |
| A | 10.010 | 10.065 | +0.55 |
| B | 10.015 | 10.095 | +0.80 |
| C | 10.010 | 10.080 | +0.70 |
| D | 10.010 | 10.085 | +0.75 |

TABLE XI

TRIAL #3 TEST DATA
PE-100/HRJ-10753/RB-PSA/HRJ-10753/PE-100

| | INITIAL | ONE WEEK | |
|---|---|---|---|
| | LENGTH (inch) | LENGTH | % SWELL |
| A | 10.010 | 10.070 | +0.60 |
| B | 10.010 | 10.080 | +0.70 |
| C | 10.010 | 10.090 | +0.80 |
| D | 10.020 | 10.095 | +0.75 |

While the present invention has been illustrated in terms of a single barrier layer on a facestock and a single adhesive layer on the barrier layer, those skilled in the relevant art will appreciate that any given layer may be a composite of several layers or mixtures of polymers so long as one layer acts as a barrier layer to inhibit the migration of mobile species between an adhesive layer and a facestock of a multilayer adhesive construction. Those skilled in the relevant art also will appreciate that additional adhesive layers may be added to the present invention and that alternative compositions of the facestock, the adhesive layer, and the barrier layer may be used without detracting from the inventive construction and inventive means of inhibiting migration of mobile ingredients disclosed herein. For example, the present invention may also be used with paper-based facestock, where the barrier layer functions to inhibit migration of mobile species from the adhesive layer to the paper facestock, wherein the mobile species are of the type which might discolor, stain, or otherwise adversely affect the facestock in the absence of a barrier layer.

It will also be appreciated that certain variations of the present invention may suggest themselves to those skilled in the art. The foregoing detailed description is to be clearly understood as given by way of illustration, the spirit and scope of this invention being limited solely by the appended claims.

We claim:

1. A multi-layer adhesive construction comprising:

a facestock;

a barrier layer on the facestock; and an adhesive layer on the barrier layer, wherein said adhesive layer comprises an adhesive containing at least one migratory organic species, wherein said migratory organic species is substantially insoluble in said barrier layer;

wherein said barrier layer comprises a pressure-sensitive adhesive, and said barrier layer is adapted to inhibit migration of said migratory organic species from said adhesive layer to said facestock.

2. The construction of claim 1, wherein said facestock comprises a polymeric material.

3. The construction of claim 2, wherein said facestock comprises a polyolefin.

4. The construction of claim 3, wherein said polyolefin is polyethylene.

5. The construction of claim 1, wherein said facestock comprises paper.

6. The construction of claim 1, wherein said barrier layer comprises an acrylic-based adhesive.

7. The construction of claim 3, wherein said barrier layer comprises a product of a polymerization reaction involving at least one monomer selected from the group consisting of acrylates and methacrylates.

8. The construction of claim 3, wherein said barrier layer is formed from a polymerization reaction involving at least one monomer selected from the group consisting of methyl acrylate, ethyl acrylate, n-propyl acrylate, isopropyl acrylate, n-butyl acrylate, isobutyl acrylate, n-amyl acrylate, isoamyl acrylate, n-hexyl acrylate, isohexyl acrylate, cyclohexyl acrylate, isooctyl acrylate, 2-ethyl hexyl acrylate, decyl acrylate, lauryl acrylate, stearyl acrylate, isobornyl acrylate, methyl methacrylate, ethyl methacrylate, n-propyl methacrylate, isopropyl methacrylate, n-butyl methacrylate, isobutyl methacrylate, n-amyl methacrylate, isoamyl methacrylate, n-hexyl methacrylate, isohexyl methacrylate, cyclohexyl methacrylate, isooctyl methacrylate, 2-ethyl hexyl methacrylate, decyl methacrylate, lauryl methacrylate, stearyl methacrylate, and isobornyl methacrylate.

9. The construction of claim 7, wherein said barrier layer comprises a product of a polymerization reaction involving at least one monomer selected from the group consisting of vinyl esters, styrenes, substituted styrenes, fumarates, maleates, vinyl lactams, and other olefinic unsaturated monomers which copolymerize with acrylate and methacrylate.

10. The construction of claim 8, wherein said barrier layer is formed from a product of a polymerization reaction of at least one monomer of the group consisting of vinyl esters, styrenes, substituted styrenes, fumarates, maleates, vinyl lactams, and other olefinic unsaturated monomers which copolymerize with acrylate and methacrylate.

11. The construction of claim 1, wherein said adhesive layer comprises a rubber-based pressure-sensitive adhesive.

12. The construction of claim 11, wherein said adhesive layer comprises at least one compound selected from the group consisting of polyisoprene, polybutadiene, styrene-butadiene polymers, styrene-butadiene block copolymers, multi-armed repeating styrene-butadiene copolymers, styrene-isoprene-styrene polymers, styrene-butadiene-styrene polymers, styrene-isoprene polymers, styrene-isoprene block copolymers, and multi-armed repeating styrene-isoprene copolymers.

13. The construction of claim 1, wherein said migratory organic species is selected from the group consisting of resins, oils, plasticizers, and tackifiers.

14. A method of inhibiting migration of at least one migratory species in a multi-layer adhesive construction, comprising the steps of:

providing a facestock;

applying a barrier layer to the facestock; and applying an adhesive layer to the barrier layer, said adhesive layer comprising at least one migratory species, wherein said migratory organic species is substantially insoluble in said barrier layer;

wherein said barrier layer comprises a pressure-sensitive adhesive which inhibits migration of the migratory species from the adhesive layer to the facestock.

15. The method of claim 14, wherein said facestock comprises a polymeric material.

16. The method of claim 15, wherein said facestock comprises a polyolefin.

17. The method of claim 16, wherein said polyolefin is polyethylene.

18. The method of claim 14, wherein said facestock comprises paper.

19. The method of claim 14, wherein said barrier layer comprises an acrylic-based adhesive.

20. The method of claim 16, further comprising the step of forming said barrier layer from a product of a polymerization reaction of at least one monomer selected from the group consisting of acrylates and methacrylates.

21. The method of claim 16, further comprising the step of forming said barrier layer from a product of a polymerization reaction of at least one monomer selected from the group consisting of methyl acrylate, ethyl acrylate, n-propyl acrylate, isopropyl acrylate, n-butyl acrylate, isobutyl acrylate, n-amyl acrylate, isoamyl acrylate, n-hexyl acrylate, isohexyl acrylate, cyclohexyl acrylate, isooctyl acrylate, 2-ethyl hexyl acrylate, decyl acrylate, lauryl acrylate, stearyl acrylate, isobornyl acrylate, methyl methacrylate, ethyl methacrylate, n-propyl methacrylate, isopropyl methacrylate, n-butyl methacrylate, isobutyl methacrylate, n-amyl methacrylate, isoamyl methacrylate, n-hexyl methacrylate, isohexyl methacrylate, cyclohexyl methacrylate, isooctyl methacrylate, 2-ethyl hexyl methacrylate, decyl methacrylate, lauryl methacrylate, stearyl methacrylate, and isobornyl methacrylate.

22. The method of claim 20, wherein said barrier layer is formed from a product of a polymerization reaction of at least one monomer selected from the group consisting of vinyl esters, styrenes, substituted styrenes, fumarates, maleates, vinyl lactams, and other olefinic unsaturated monomers which copolymerize with acrylate and methacrylate.

23. The method of claim 21, wherein said barrier layer is formed from a product of a polymerization reaction of at least one monomer selected from the group consisting of vinyl esters, styrenes, substituted styrenes, fumarates, maleates, vinyl lactams, and other olefinic unsaturated monomers which copolymerize with acrylate and methacrylate.

24. The method of claim 14, wherein said adhesive layer comprises a rubber-based pressure-sensitive adhesive.

25. The method of claim 24, wherein said adhesive layer comprises at least one compound selected from the group consisting of polyisoprene, polybutadiene, styrene-butadiene polymers, styrene-butadiene block copolymers, multi-armed repeating styrene-butadiene copolymers, styrene-isoprene-styrene polymers, styrene-butadiene-styrene polymers, styrene-isoprene polymers, styrene-isoprene block copolymers, and multi-armed repeating styrene-isoprene copolymers.

26. The method of claim 14, wherein said migratory organic species is selected from the group consisting of resins, oils, plasticizers, and tackifiers.

27. A method of producing a stabilized multi-layer pressure-sensitive adhesive construction of the type containing facestock destabilizing species in the adhesive layer, said method comprising the steps of:

providing a facestock;

applying an acrylic based adhesive barrier layer on the facestock, and applying a rubber-based adhesive layer on the barrier layer, said rubber-based adhesive having migratory facestock destabilizing species therein;

wherein said barrier layer inhibits migration of said destabilizing species from said adhesive layer to said facestock.

28. The method of claim 27, wherein the barrier layer and the adhesive layer are applied substantially simultaneously.

29. The method of claim 27, wherein said facestock comprises a polymeric material.

30. The method of claim 29, wherein said facestock comprises a polyolefin, and said destabilizing species are of the type which cause wrinkling and/or loss of adhesion after migration to polyolefinic facestocks.

31. The method of claim 30, wherein the polyolefin is polyethylene.

32. The method of claim 27, wherein the facestock comprises paper, and said destabilizing species are of the type which cause at least one of the following: discoloration of said paper facestock after migration to said paper facestock and staining of said paper facestock after migration to said paper facestock.

33. The multi-layer adhesive construction of claim 1, wherein said migratory organic species is soluble in said facestock.

34. The multi-layer adhesive construction of claim 1, wherein said barrier layer comprises a polar pressure-sensitive adhesive.

35. The multi-layer adhesive construction of claim 34, wherein said facestock and said adhesive layer are apolar.

36. The multi-layer adhesive construction of claim 35, wherein said barrier layer comprises an acrylic-based pressure-sensitive adhesive.

37. The multi-layer adhesive construction of claim 34, wherein said adhesive layer comprises a rubber-based pressure-sensitive adhesive.

38. The multi-layer adhesive construction of claim 36, wherein said adhesive layer comprises a rubber-based pressure-sensitive adhesive.

* * * * *